United States Patent Office 2,818,366
Patented Dec. 31, 1957

2,818,366

METHOD OF CONTROLLING NEMATODES EMPLOYING HALOALKYL PHOSPHONIC DIHALIDES

Gail H. Birum, Dayton, Ohio, assignor to Monsanto Chemical Company, St. Louis, Mo., a corporation of Delaware No Drawing. Application September 21, 1955
Serial No. 535,731

6 Claims. (Cl. 167—22)

This invention relates to the control of endoparasitic and ectoparasitic worms which exist in the soil at some stage of their life cycles, for example, eggs, larvae and adult worms. The invention is particularly directed to methods of inhibiting and eradicating nematodes or eelworms.

The control of nematodes and other parasitic worms in soil is a complex problem. These organisms, either in the egg, larvae or adult stage, are protected by a difficultly permeable membrane. Hence, the effective toxicant must have both the property of penetrating the resistant coatings and the ability to kill. It must also be readily dispersible in soils or other environment of the organism and be stable when incorporated therein. Since the object of ridding soils of nematodes and parasites is to provide a beneficial growth media for plants, the nematocide or parasiticide must not be phtotoxic to plants, or, if phytotoxic, this effect must not be long-lived.

For the reasons set forth above, completely effective agents for nematodes and other parasitic worm life are not generally available. Furthermore, one skilled in the art cannot predict the effectiveness of compounds as practicable toxicants, even though the physical and biological properties of the compounds are well known.

It has now been found that phosphonic dichlorides are very effective as nematocides and as agents for controlling other parasitic worms. The presently useful compounds are haloalkylene phosphonic halides having the formula

X—R—POX$_2$ in which X is selected from the class consisting of chlorine and bromine and R is an alkylene radical of from 1 to 3 carbon atoms.

One example of a phosphonic dihalide having the above formula and useful for the present purpose is (chloromethyl)phosphonic dichloride which is prepared from paraformaldehyde and phosphorus trichloride as described by Kabachnik et al., "Akad. Nauk SSSR, Inst. Org. Khim., Sintezy Org., Soedinenii, Sbornik," 2, 150-1 (1952); C. A. 48, 564 (1948). (Bromomethyl)phosphonic dibromide or (chloromethyl)phosphonic dibromide similarly prepared from either phosphorus trichloride or phosphorus chloride dibromide, respectively, is also presently useful. α-(Chloroethyl)phosphonic dichloride or α-(bromoethyl)-phosphonic dibromide obtainable from acetaldehyde and phosphorus trichloride or phosphorus tribromide, respectively, are other examples of presently useful phosphonic halides. The (chloropropyl)phosphonic dichloride obtainable by reaction of propionaldehyde with phosphorus trichloride is also useful.

Other examples of haloalkyl phosphonic dihalides useful for the present purpose are β-(chloroethyl)phosphonic dichloride or β-(bromoethyl)phosphonic dichloride which are prepared by reacting ethylene oxide with phosphorus trichloride or phosphorus bromide dichloride and then treating the product thus obtained with phosphorus pentachloride substantially according to the method described by Kabachnik, pages 142–3 of the above reference. The (chloroisopropyl)phosphonic dichloride or (bromoisopropyl)phosphonic dibromide similarly obtained from a like reaction with propylene oxide and phosphorus trichloride or phosphorus tribromide are also useful as the active ingredients of the present nematocidal compositions.

The invention is further illustrated but not limited by the following example.

Example

This example shows evaluation of (chloromethyl)phosphonic dichloride as a nematocidal agent. It was conducted on an aqueous nematode culture since it is known that a nematode when placed in water flexes its body at a more or less constant rate and that the effect of a nematocide can be estimated with reasonable accuracy by counting the rate of these flexures.

To a vessel of water containing about 250 live nematodes (*Panagrellus redivivus*) there was added a quantity of the said dichloride to produce a 0.1% concentration of the same in the water. The organisms were examined by means of a stereoscopic microscope and the motility estimated and recorded at timed intervals. At the same time a "control" vessel of the same number of said nematodes in water containing no additive was examined. Observation of the nematodes at the end of one hour, two hours, and 24 hours gave motilities of 50%, 10% and 0.0% respectively, for nematodes in the water to which the phosphonic dichloride had been added, as compared to 100% at each of these 3 time intervals for the nematodes in the "control."

Nematocidal compositions comprising the present phosphonic dichlorides are effective in eliminating or controlling nematode activity when applied to the soil at the rate of 10 to 600 lbs. per acre. Preferred level of application useful in soils of average infestation will be from 50 to 200 lbs. per acre.

Obviously, heavily infested areas may require the use of higher proportions and lightly infested areas may be treated effectively with smaller proportions. The compositions being water-dispersible may be applied by spraying on a cultivated field so as to permit penetration to a substantial depth. More effective methods of distribution of the nematocide may involve the introduction in irrigation water or by injection into the soil by a suitable jet following a plow or harrowing device. Other methods of treating soils with liquid compositions are adapted for use in the practice of this invention.

In addition to the use in soils, the invention may be practiced in any other nematode environment, for example, greenhouse potting mixtures and other soil substitutes. Nematode environments may include rooted plants, tubers, seeds and bulbs, in which case the toxicant is used as a rinse to remove and destroy eggs, larvae and adult nematodes which may be present.

What I claim is:

1. The method of controlling endoparasitic worms which comprises applying to soils, plants and seeds susceptible to infestation by the worms with a composition comprising a phosphonic dihalide of the formula

X—R—POX$_2$ in which R is an alkylene radical of from 1 to 3 carbon atoms and X is selected from the class consisting of chlorine and bromine.

2. The method of controlling nematodes which comprises applying to soils, plants and seeds susceptible to infestation by the nematodes with a composition comprising a phosphonic dihalide of the formula $$X—R—POX_2$$

in which R is an alkylene radical of from 1 to 3 carbon atoms and X is selected from the class consisting of chlorine and bromine.

3. The method of controlling nematodes which comprises applying to soils, plants and seeds susceptible to infestation by the nematodes with a composition comprising a phosphonic dichloride of the formula $$Cl—R—POCl_2$$

in which R is an alkylene radical of from 1 to 3 carbon atoms.

4. The method of treating nematode-infested soil which comprises dispersing in the soil a toxic quantity of a phosphonic dichloride of the formula $$Cl—R—POCl_2$$

in which R is an alkylene radical of from 1 to 3 carbon atoms.

5. The method of controlling nematodes which comprises applying to soils, plants and seeds susceptible to infestation by the menatodes with a composition comprising (chloromethyl)phosphonic dichloride.

6. The method of treating nematode-infested soil which comprises dispersing in the soil a toxic quantity of (chloromethyl)phosphoric dichloride.

References Cited in the file of this patent

Frear et al.: J. Econ. Entomology, vol. 40, No. 5, 1947, pp. 736–741.
Coover: Organic Chem. Bull. (4 pp.), vol. 23, No. 4, 1951.
Chem. Abstrs., vol. 46, 1952, p. 7234.
Bannard et al.: Can. J. Chem. 31, pp. 976–983 (1953).